United States Patent [19]

Yamamoto et al.

[11] Patent Number: 5,304,261
[45] Date of Patent: Apr. 19, 1994

[54] METHOD OF FABRICATING A CHANNEL BOX OR OTHER PART FOR A NUCLEAR REACTOR

[75] Inventors: Nobukazu Yamamoto; Kouichi Matsumoto; Junjiro Nakajima, all of Hitachi; Hideo Maki, Katsuta; Hiromasa Hirakawa, Hitachi; Masahisa Inagaki, Hitachi; Iwao Takase, Toukai; Nobuhiro Okazaki, Hitachi; Hideaki Ishizaki, Mito; Toraki Sakuma, Hitachi, all of Japan

[73] Assignee: Hitachi, Ltd., Tokyo, Japan

[21] Appl. No.: 913,468

[22] Filed: Jul. 15, 1992

[30] Foreign Application Priority Data

Jul. 15, 1991 [JP] Japan .................................. 3-173595

[51] Int. Cl.⁵ .............................................. C23F 1/02
[52] U.S. Cl. ..................................... 148/519; 148/521; 148/668; 148/672; 156/656; 156/664; 204/129.1
[58] Field of Search ............... 148/516, 519, 521, 668, 148/672; 156/656, 664; 204/129.1; 219/69.17; 252/79.3

[56] References Cited

U.S. PATENT DOCUMENTS

| | | | |
|---|---|---|---|
| 4,017,368 | 4/1977 | Wax et al. ............................ | 156/656 |
| 4,238,251 | 12/1980 | Williams et al. ..................... | 148/672 |
| 4,390,497 | 6/1983 | Rosenbaum et al. ................ | 148/519 |
| 4,563,238 | 1/1986 | Rhoades ............................... | 156/637 |
| 4,624,714 | 11/1986 | Smickley et al. .................... | 148/668 |
| 4,678,521 | 7/1987 | Yoshida et al. ...................... | 148/672 |
| 4,749,543 | 6/1988 | Crowther et al. .................... | 376/443 |
| 4,749,544 | 6/1988 | Crowther et al. .................... | 376/443 |

FOREIGN PATENT DOCUMENTS

| | | |
|---|---|---|
| 283836 | 9/1988 | European Pat. Off. . |
| 353733 | 2/1990 | European Pat. Off. . |
| 4040505 | 6/1991 | Fed. Rep. of Germany . |
| 2302348 | 9/1976 | France . |
| 57-131354 | 8/1982 | Japan . |
| 1-13075 | 3/1989 | Japan . |
| 1-227991 | 9/1989 | Japan . |

*Primary Examiner*—George Wyszomierski
*Attorney, Agent, or Firm*—Antonelli, Terry, Stout & Kraus

[57] ABSTRACT

In a method of fabricating a channel box for use in a nuclear reactor, Zr-alloy sheet material is formed into a tubular channel box. The method includes solution heat treatment of the Zr-alloy sheet material including quenching from a temperature at which $\beta$-phase is present. After the solution heat treatment, portions of the Zr-alloy sheet are thinned relative to other portions by a non-stressing thinning process, such as chemical etching in a bath. The corrosion resistance imparted by heat treatment is retained, and the heat treatment itself is easily performed on material of uniform thickness.

36 Claims, 6 Drawing Sheets

FIG. 5
PRIOR ART
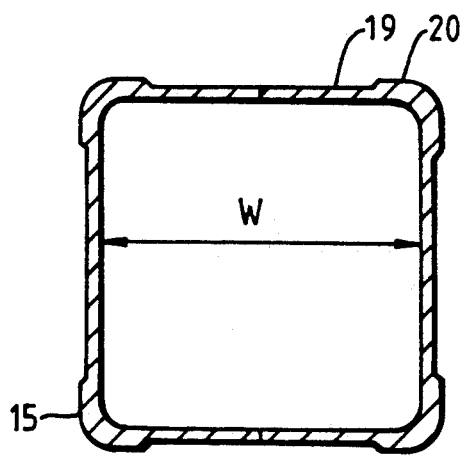
FIG. 7
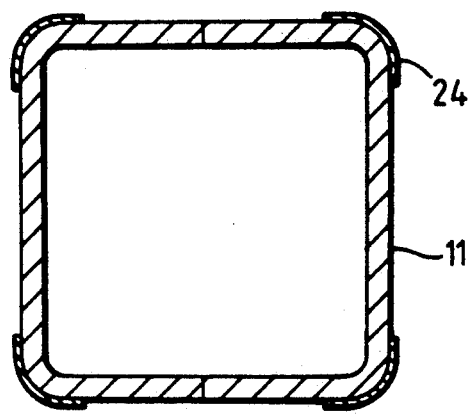
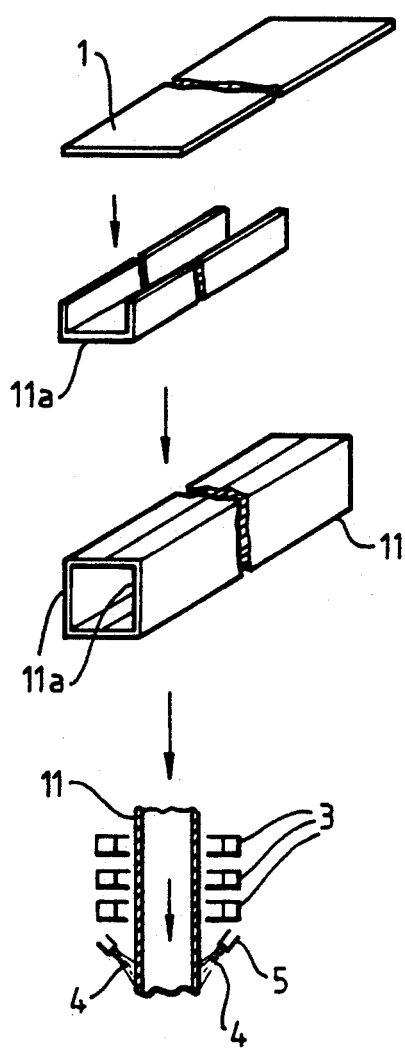
FIG. 6
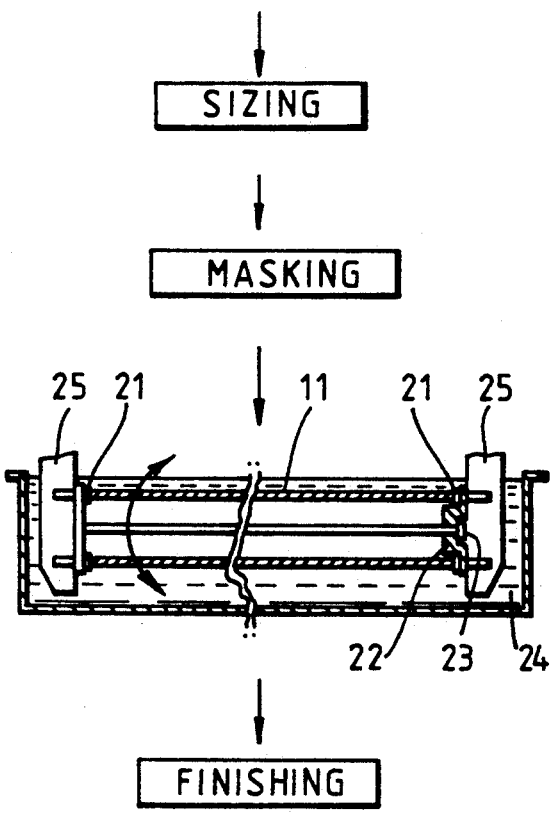

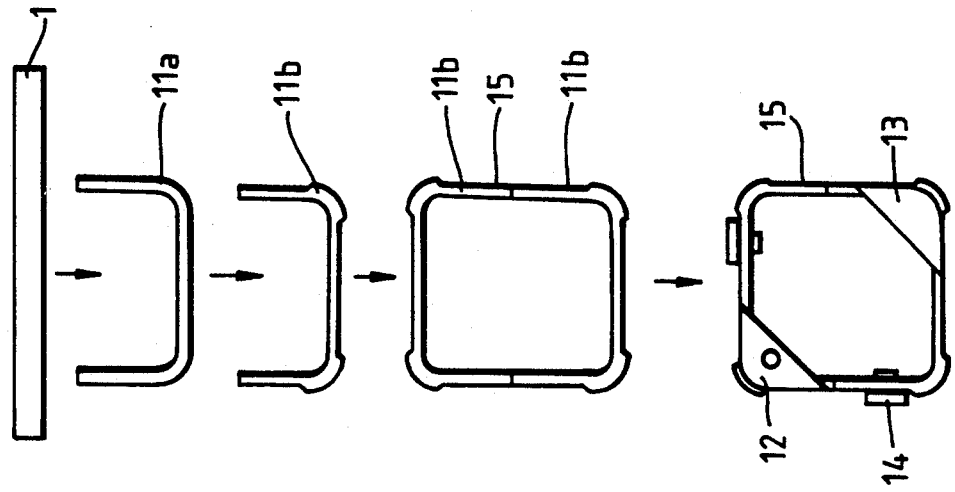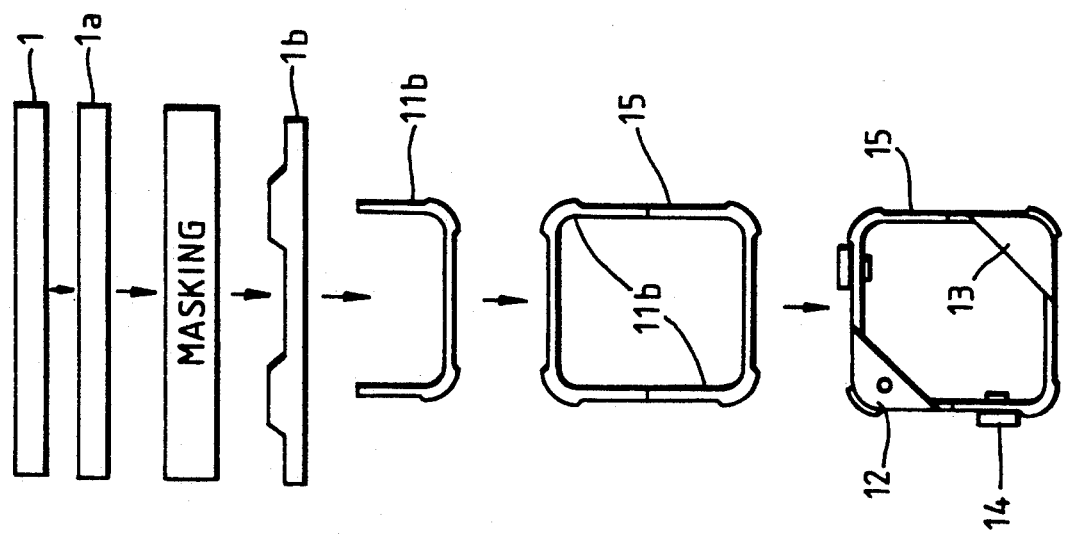

FIG. 11
FIG. 12
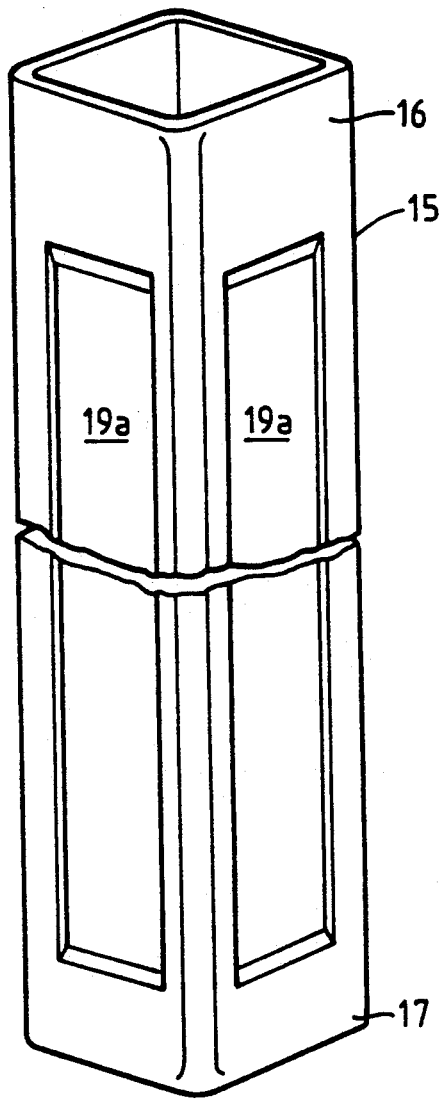
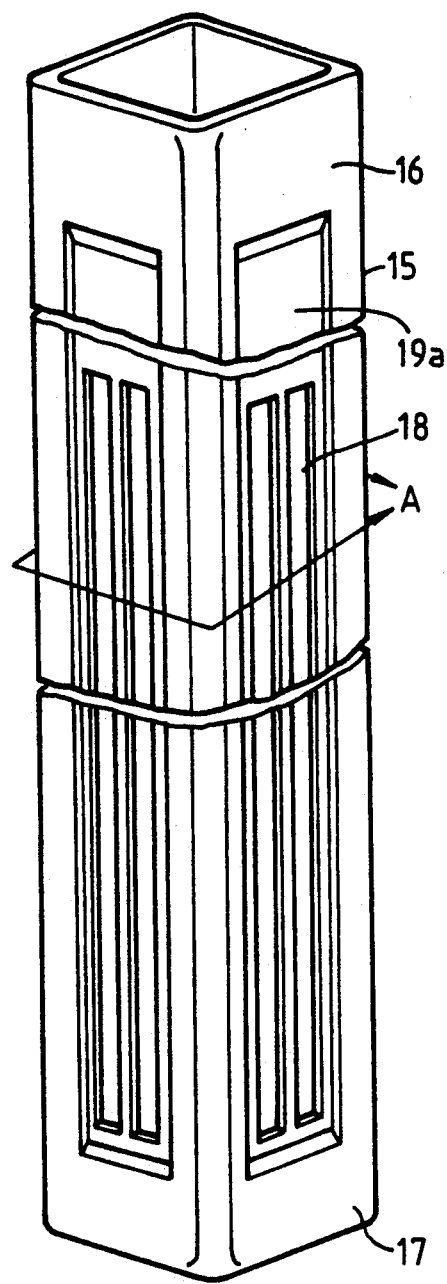

METHOD OF FABRICATING A CHANNEL BOX OR OTHER PART FOR A NUCLEAR REACTOR

BACKGROUND OF THE INVENTION

1. Field of the Invention

The present invention relates to a method of fabricating a part for use in a nuclear reactor which part is exposed to neutron flux in use, and in particular, but not exclusively, to a method of fabricating a channel box for a fuel assembly to be loaded in the core of a boiling-water reactor.

2. Description of the Prior Art

FIGS. 1 and 2 of the accompanying drawings show the shape of a conventional channel box of a fuel assembly for a boiling-water reactor. This channel box is also known as a channel. It consists of a square-section tubular body 11 with rounded corners made by butt welding two previously bent zirconium alloy plates 11a. In section, as shown in FIG. 2, the four corners and the four sides joining them have the same uniform thickness. At the upper end of the channel box there are provided the conventional welded-on additions, which are a clip 12 with a hole for use in locating and fixing the channel box on the upper tie plate of the fuel assembly, a clip 13 without a hole at the diagonally opposite corner, and on the outside of the channel box on two sides channel spacers 14. The spacers 14 face the control rod space in the core of the reactor, and serve to maintain the gaps between the channel boxes of adjacent fuel assemblies.

FIG. 3 shows a method of fabricating the channel box of FIGS. 1 and 2, this process being generally similar to what is disclosed in U.S. Pat. No. 4,238,251. Two flat plates 1 of zirconium alloy are bent to form two U-shaped pieces 11a, which are then butt welded to form the tubular body 11. The body 11 then undergoes solution heat treatment including a quenching step from a temperature at which the zirconium alloy has a β-phase, in order to provide high corrosion resistance to the material. Thereafter, there is a sizing step to achieve accuracy of size of the channel box, and finally a finishing step in which the clips 12, 13 and spacers 14 are fitted.

U.S. Pat. No. 4,238,251 mentioned above particularly describes the solution heat treatment process, whose function is to give the material high corrosion resistance. This solution heat treatment process involves heating the zirconium alloy to a region at which the β-phase exists, which may be the β-phase region in its phase diagram or the region of the α-phase and β-phase in the phase diagram, followed by quenching rapidly to below the phase transition temperature.

A further disclosure of solution heat treatment processes which may be employed in the present invention is U.S. Pat. No. 4,678,521 (corresponding to JP-B-61-45699) which is primarily a disclosure of a process for producing the flat zirconium alloy plate 1 shown in FIG. 3. However, the process includes solution heat treatment steps, which may be employed in the present invention (see particularly column 7, lines 31–42).

Because of its exposure to the neutron flux in the reactor core, the channel box tends to suffer from bulging of its sides, due to creep expansion. It also suffers from embrittlement, oxidation and elongation. To reduce the problem of bulging, at least by extending the useful life of the channel box, it has been proposed to form the channel box with thin side portions 19 between thicker corner portions 20, as shown in present FIGS. 4 and 5 (JP-B-1-13075). Typically the thinner side portions 19 are thinner than the uniform thickness of the channel box of FIG. 1, and the thicker corner portions 20 are thicker than the uniform thickness of the channel 11 of FIG. 1. The effect is to provide greater clearance between the thin portions 19 and the space occupied by the control rod in the reactor core, so that the tolerance for bulging is greater.

One process for making the channel box of FIG. 4 is disclosed in U.S. Pat. No. 4,749,543 and U.S. Pat. No. 4,749,544 (corresponding to JP-A-63-253290). This process involves forming eight zirconium alloy parts, comprising four corner parts and four thin side parts, and welding these together along lines extending longitudinally of the channel box. The thin side parts may have thinner grooves extending part of the length of the channel box, formed by machining.

Another process for fabricating the channel box of FIG. 4 is disclosed in JP-A-1-227991, in which zirconium alloy sheets are first rolled between special rolls, one of which has larger and smaller diameter portions to form thicker and thinner portions of the plates corresponding to corners and side portions of the channel box, after which the corner portions are bent to give two U-section pieces. These two pieces are then welded to form the channel box 15. It appears more convenient to form these U-section pieces in shorter lengths than the full length of the channel box, and to weld these lengths together to form a full length piece, prior to welding longitudinally.

The disadvantage of the fabricating process of U.S. Pat. No. 4,749,544 is the complexity of preparing four corner parts and four thin side parts and welding these together along eight lines, which is not only time-consuming but also makes quality control difficult, as compared with the process of FIG. 3 where two welds are required. U.S. Pat. No. 4,749,544 does not disclose any heat treatment to improve corrosion resistance.

The process of JP-A-1-227991 is disadvantageous, because it is difficult to roll long plates having thinner and thicker portions in zirconium alloy, and as mentioned it is necessary to sub-divide the parts longitudinally, and then weld them together.

Although it is not published, it can be mentioned here that the present inventors have attempted to apply the process of solution heat treatment described above, to the zirconium alloy channel box having side portions of reduced thickness, i.e. the channel box of FIG. 4. It is not difficult to subject the channel box 11 of FIG. 1 to solution heat treatment, to achieve high corrosion resistance, but difficulties arise in applying the same process to the channel box of FIG. 3 having different wall thicknesses, so as to achieve circumferentially uniform solution heat treatment. The same problem arises if the body has a longitudinal variation of wall thickness.

SUMMARY OF THE INVENTION

An object of the present invention is therefore to provide a method of fabricating a channel box or other part for a nuclear reactor which has non-uniform wall thickness and is subjected to solution heat treatment in order to achieve high corrosion resistance, so that it can be satisfactorily be used in a nuclear reactor.

In one aspect, the invention provides a method of fabricating a part for use in a nuclear reactor which part is exposed to neutron flux in use, from sheet material selected from metals and alloys having a high temperature phase which is different from a phase existing at room temperature by quenching, said method including the steps of
  (a) solution heat treatment of said sheet material including quenching from a temperature at which said high temperature phase is present, and
  (b) thinning at least one portion of said sheet material relative to other portions by a non-stressing thinning process, wherein step (a) is performed before step (b).

The invention can thus be applied in principle to any metal or alloy whose property or properties, particularly at least one of corrosion resistance, mechanical properties and behaviour under irradiation, is or are improved by quenching. The invention is particularly applicable to alloys whose main component is a metal of Group IVA of the Periodic Table, i.e. Zr, Hf and Ti.

In a nuclear reactor, Hf alloy can be used for control rods. The present invention can be employed in the fabrication, including thinning, of such rods. Ti is light in weight and can be used for parts of control rod drive apparatus, and the invention may be used in the manufacture of such parts.

The invention is especially applicable to the manufacture of channel boxes of Zr-alloy, and will be described below mainly in relation to this, but the same general principles are applicable to the manufacture of other suitable parts for a nuclear reactor.

In another aspect, therefore, the invention provides a method of fabricating a channel box for use in a nuclear reactor, in which Zr-alloy sheet material is formed into a tubular channel box, said method including the steps of
  (a) solution heat treatment of the Zr-alloy sheet material including quenching from a temperature at which $\beta$-phase is present
  (b) thinning at least one portion of said Zr-alloy sheet material relative to other portions by a non-stressing thinning process,
    wherein step (a) is performed before step (b).

The main advantages provided by the present invention are that the zirconium alloy sheet material can be uniformly heat treated to increase its corrosion resistance by the solution heat treatment method. Thus in the invention the solution heat treatment method is in general applied to sheet material of uniform thickness. Subsequent to the heat treatment, the sheet material is subjected to the thinning process, which does not cause deformation, because a non-stressing thinning process is employed. The fabrication steps can be simple, and a number of pieces required for assembly of a part can be kept very small. Thus a channel box which has a useful life in a nuclear reactor core can be fabricated.

By a non-stressing thinning process, we mean a metal-removing process which applies substantially no mechanical stress to the metal, e.g. no cutting stress and no shearing stress, such as is caused by a cutting tool contacting the metal. Contact of a tool with the metal is not excluded in the present invention, but should be such as to exert no significant mechanical stress. Thus the metal reducing process should not lead to strain or any residual stress in the sheet material, which has previously been subjected to the solution heat treatment.

Where the fabrication method includes a step of welding two portions of the sheet material to join them along a weld line, it is preferred that the welding step is performed before the thinning step. The welding step may be the joining of two portions of one piece of the sheet material, or more preferably the joining of two or more pieces, particularly the joining of two pieces along two weld lines.

It is also preferred that the solution heat treatment step is performed after such a welding step or steps, in order to avoid any deterioration of the heat treated metal in the welding step.

Preferably the sheet material is formed into a tube before the solution heat treatment step. The tube may be a rectangular, preferably square, section tube with rounded corners as is conventional for a channel box. Alternatively, the steps of solution heat treatment and thinning may be performed on the sheet material when it is in flat plate form. Alternatively again, the thinning step may be performed on sheets of the sheet material having a U-section shape, before these sheets are joined to form the channel box. It is particularly preferred that the channel box is assembled from two U-section sheet of the sheet material, by welding along weld lines which are located at central portions of opposite sides of the box.

One preferred method of fabricating a channel box for use in a nuclear reactor in accordance with the invention, comprises the steps of:
  (i) bending two flat plates of Zr-alloy sheet material into U-section shaped pieces
  (ii) welding said U-section shaped pieces together at edges thereof to form a hollow tubular body having sides and corners,
  (iii) performing a solution heat treatment of said hollow tubular body including quenching it from a temperature at which $\beta$-phase is present
  (iv) thinning selected portions of said sides of said hollow tubular body after step (iii) by chemical etching.

A second preferred method of fabricating a channel box according to the invention comprises the steps of
  (i) performing a solution heat treatment of two flat plates of Zr-alloy sheet material including quenching them from a temperature at which $\beta$-phase is present,
  (ii) thinning selected portions of said plates, after step (i), by chemical etching
  (iii) bending said plates, after step (ii), into U-section shaped pieces having corners and sides, with said thinned portions thereof located in said sides
  (iv) welding said U-section shaped pieces together at edges thereof to form a hollow tubular body.

A third method of fabricating a channel box according to the invention comprises the steps of
  (i) bending two flat plates of Zr-alloy sheet material into U-section shaped pieces having sides and corners,
  (ii) performing a solution heat treatment of said U-section shaped pieces including quenching them from a temperature at which $\beta$-phase is present,
  (iii) after step (ii), thinning selected portions, located in said sides of said U-section shaped pieces, by chemical etching,
  (iv) after step (iii) welding said U-section shaped pieces together at edges thereof to form a hollow tubular body.

A fourth preferred method of fabricating a channel box according to the invention comprises the steps of
  (i) performing heat treatment of two flat plates of Zr-alloy sheet material including quenching them from a temperature at which $\beta$-phase is present, (ii) bending said two plates, after stel (i), into U-section shaped pieces, (iii) after step (ii), welding said U-section shaped pieces together at edges thereof, to form a hollow tubular body having sides and corners, (iv) thinning selected portions of said sides of said hollow tubular body by chemical etching.

A fifth preferred method of fabricating a channel box according to the invention, comprises the steps of (i) bending two flat plates of Zr-alloy sheet-material into U-section shaped pieces, (ii) performing solution heat treatment of said U-section shaped pieces including quenching them from a temperature at which β-phase is present, (iii) after step (ii) welding said U-section shaped pieces together at edges thereof to form a hollow tubular body having sides and corners, (iv) thinning selected portions located in said sides of hollow tubular body by chemical etching.

The non-stressing thinning process is preferably selected from chemical etching, electro-discharge grinding, electro-discharge machining and electro-etching. In chemical etching, which is most preferred, it is generally required to employ a mask, covering the parts which are not to be etched, and it is particularly preferred in the present method to use an oxide film formed by oxidation of the zirconium alloy as the mask. This oxidation film may be present as a result of the solution heat treatment or as a result of the manufacturing process of the zirconium alloy, and the portions of it which are not required as a mask can be easily removed, for example by grit blasting, using a simple adhesive tape as a mask in the grit blasting process. Alternatively or additionally, during the chemical etching, a different mask material can be applied, for example a PTFE (polytetrafluoroethylene) fabric. The zirconium alloys particularly preferred for use for making a channel box in accordance with the present invention are those having the composition by weight:

Sn not more than 10%, e.g. 1-5%
Nb not more than 20%, e.g. 1-5%
Cr not more than 50%, e.g. not more than 0.2%
Fe not more than 5%, e.g. not more than 0.5%
Ni not more than 5%, e.g. not more than 0.1%
Mo not more than 5%
V not more than 5%
Cu not more than 5%
balance Zr and unavoidable impurities. Preferably at least one of Sn and Nb is present, e.g. in an amount of at least 1% in each case.

The most preferred composition of the zirconium alloy, of which the known materials Zircalloy 2 and Zircalloy 4 are examples, is:

Sn 1-2%
Fe 0.05-0.3%
Cr 0.05-0.2%
Ni maximum 0.1%
balance Zr and unavoidable impurities.

BRIEF INTRODUCTION OF THE DRAWINGS

Embodiments of the invention will now be described by way of non-limitative example, with reference to the accompanying drawings, in which:

FIG. 5 is a cross-section of the channel box of FIG. 4 on the line A—A of FIG. 4.

FIG. 6 is a flow diagram illustrating diagrammatically the method of fabricating a channel box embodying the present invention.

FIG. 7 is a cross-sectional view of a tube having masking thereon, used in the process of FIG. 6.

FIG. 8 is a flow diagram illustrating a second method of fabricating a channel box in accordance with the present invention.

FIG. 9 is a flow diagram illustrating a third fabrication method for a channel box, embodying the invention.

FIG. 11 is a perspective view of one channel box produced by a method embodying the invention.

FIG. 12 is a perspective view of a further channel box produced by a method embodying the invention.

DESCRIPTION OF THE PREFERRED EMBODIMENTS

Figure 1:
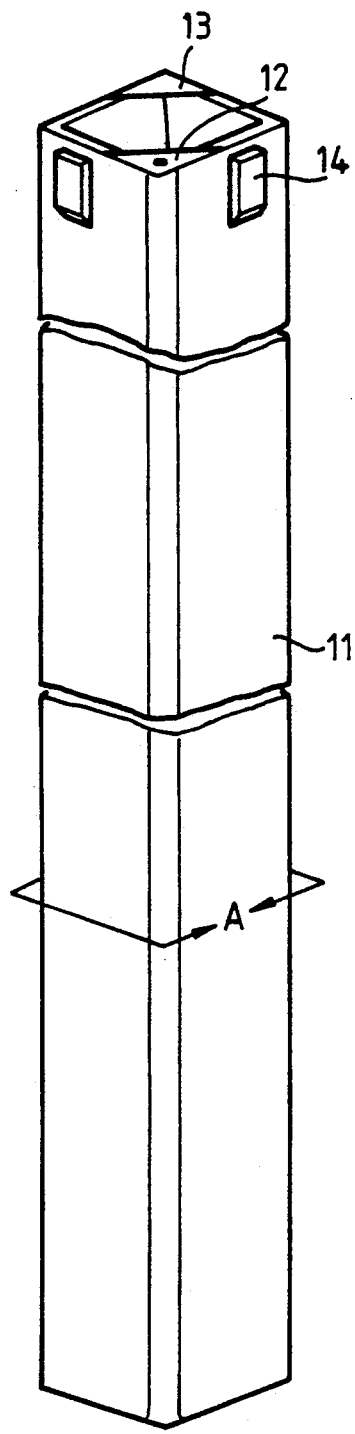
FIG. 1 is a perspective view of a known channel box, described above.
Figure 2:
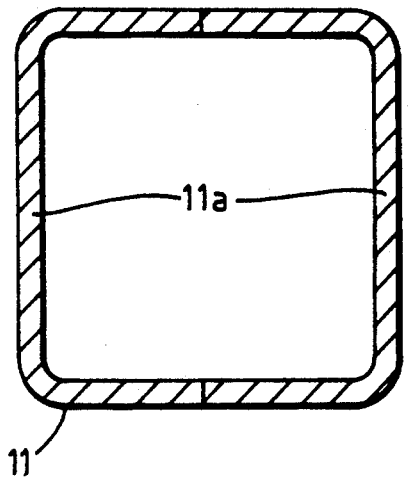
FIG. 2 is a cross-section on line A—A of FIG. 1.
Figure 3:
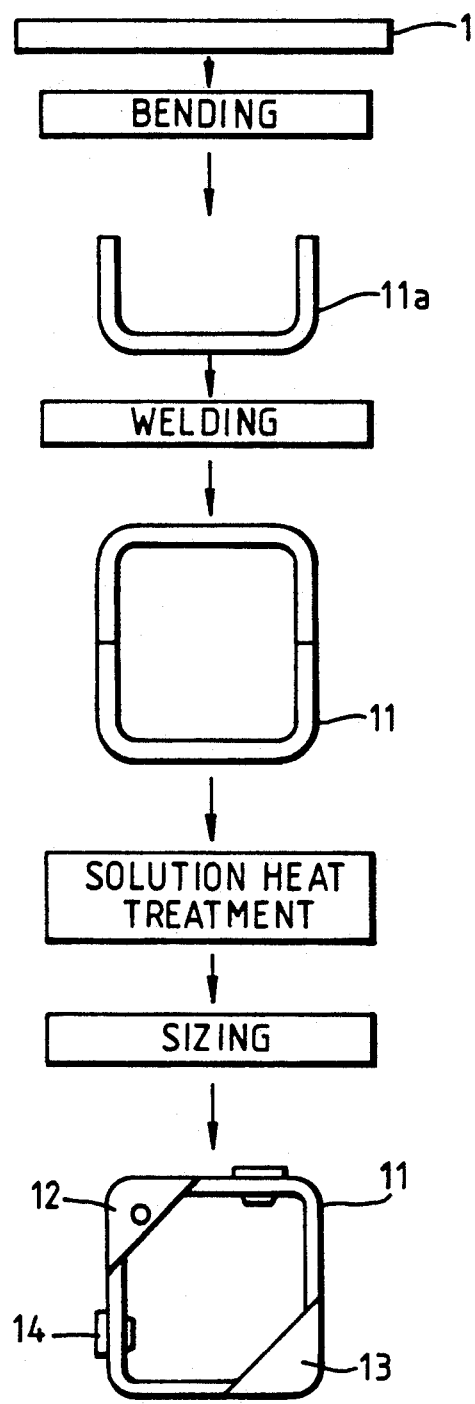
FIG. 3 is a flow diagram illustrating a known process for the fabrication of the channel box of FIG. 1.

Referring to FIG. 6, the starting material for this fabrication method embodying the invention is a flat plate 1 of zirconium alloy, such as Zircalloy 2 or Zircalloy 4, of uniform thickness. Such a flat plate 1 may be made by a conventional process of melting the alloy to produce an ingot, hot forging the ingot to form a slab of about 20 mm thickness, and performing a solution heat treatment process on the slab by heating it to a temperature region at which the β-phase is present and quenching it from that temperature region. The heat treated material is then hot rolled, cold rolled and annealed.

FIG. 6 shows that in this method embodying the invention the flat plate 1 is first bent to a U-section shape 11a using a conventional press. Two such U-section pieces 11a are subjected to edge preparation and then butt welded at their edges to form a hollow tubular body 11, having uniform thickness. The body 11 of zirconium alloy is then subjected to a solution heat treatment by passing it longitudinally through a sequence of radio-frequency induction heating coils 3 to bring it to the desired temperature of about 900° C. for a few seconds, after which the heated portion is quenched by water 4 from water jets 5 around it. A suitable coolant other than water may alternatively be used. As mentioned above, this solution heat treatment step is already known from U.S. Pat. No. 4,238,251 and U.S. Pat. No. 4,678,521. Briefly, the temperature to which the metal is raised is in the region 830 to 960° C. allowing partial transformation to the β-phase so that α-phase is also present before quenching, or the metal is raised to a temperature above 960° C. allowing complete transformation to the β-phase for quenching. The first process is called α+β quenching and the second is called β quenching. Both solution heat treatments form the highly corrosion resistant crystal structure within the wall of the tube. The product of the α+β quenching has higher ductility than that of the β quenching step, but the latter leads to a higher strength than the former.

After the heat treatment step shown in FIG. 6, a sizing step is performed, e.g. as described in JP-A-57-

131354, to expand and shape the tube 11 to a predetermined size, and at the same time to anneal it to remove any residual stress.

Next the sized tube 11 is subjected to a chemical etching process, which is an example of a non-stressing thinning process. The appropriate parts of the wall of the tube 11 are thinned, to provide the thin side portions 19 of the channel box 15 of FIGS. 4 and 5. First, masking of the parts of the wall of the tube 11, which are not to be thinned, must be carried out. The tube 11 having undergone the solution heat treatment step has an oxide coating on its surfaces, and this coating can resist the etching liquid well, so that it can be used as a masking material by leaving it on the portions at which thickness reduction is not required. It can be removed from the other portions by grit blasting. Alternatively or additionally, an acid-proof tape, such as a PTFE tape, which is effective as the masking material can be used. FIG. 5 shows the body 11 having the acid-proof tape stuck on to it at its corners, as the masking material 24.

In order to effect masking of the interior surface of the body 11, both ends of the body are sealed to prevent the etching liquid from entering, as shown in FIG. 6, by applying a pad 22 with a seal 21 to each end, and then clamping the two pads 22 together by a bolt 23 passing through the body 11.

The body 11 thus masked on its outside and with its ends closed is inserted into an etching bath 24 by means of handles 25 attached to the pads 23. The etching liquid used in this embodiment is a solution of 2% HF and about 30% $HNO_3$. For a zirconium alloy, the preferred etching liquid contains HF and $HNO_3$, preferably in the amounts of 1-3% HF and a maximum of 50% of $HNO_3$. Any etching liquid effective for zirconium alloy may be used. The duration of the etching process is determined by the required reduction of wall thickness. Typically, the amount removed is at least 0.5 mm, in the formation of a channel box. This is distinctly different from the amount of about 0.05 mm removed uniformly from the whole surface of the channel box in a pickling step which has been used in a finishing step (and can also be used in the present invention as a finishing step).

The chemical etching thus results in a tube having a cross-section as shown in FIG. 5, with thinned side portions 19 and thicker corner portions 20 of unreduced thickness. Finishing steps are then performed, to smooth the edges of the thinned portions, and to carry out other conventional finishing steps. The finishing steps include the addition of the clips 12, 13 and channel spacers 14 by welding, and also a pickling surface treatment as mentioned above.

In one particular example of the process of FIG. 6, a long body 11 of Zircalloy of interior width about 130 mm, length about 4.5 m and thickness of a few mm, was thinned at about 50% of its side areas, with the unthinned areas being covered with PTFE tape, using the etching liquid described above. The thinning process required about 2 hours etching time, and the predetermined desired dimension was successfully obtained. A similar wall thinning process was carried out by a cutting and grinding method; its dimensional accuracy was not better than that of the etching process, although it took at least ten times as long, because of the difficulty of accurately shaping a body of such length.

The process of the present invention, employing a non-stressing thinning, has been found to be highly satisfactory for an elongate tube, of a length of 4 m or more with a wall as thin as a few mm, e.g. less than 5 mm. Other processes, such as machine grinding, make it hard to maintain dimensional accuracy, and tend to introduce deformations, as well as taking a long time. Another possibility is to thin the wall by polishing, but this also requires a very long process time, even compared with cutting. The zirconium alloy which has been subjected to solution heat treatment is relatively hard, so that it is not suitable for machining, particularly grinding. The etching process preferred in the invention in particular does not introduce deformation and can provide highly accurate thinning, so that in accordance with the invention, it is possible to perform the solution heat treatment and the sizing treatment, and then to thin the body without stress, to provide a channel box of profiled cross-section with a dimensional accuracy as good as that of the conventional channel box with uniform wall thickness.

In the embodiment of FIG. 6, it has been found that the solution heat treatment and the etching process are performed well at the welding zones of the body, leading to a homogeneous product.

As an alternative to the acid-resistant tape mentioned above, a solid paraffin having acid resistance can be used to mask the tube for the chemical etching.

Figure 13:
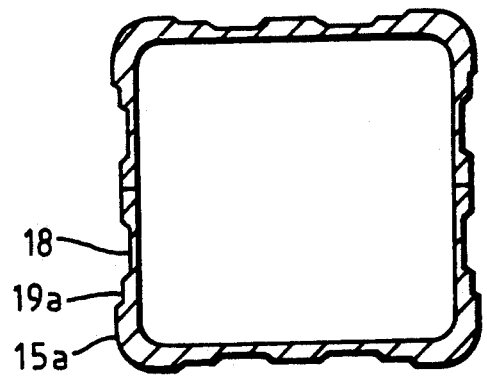
FIG. 13 is a cross-section of the channel box of FIG. 12 along the line A—A of FIG. 12.

The chemical etching process can easily be adapted to form a body 15 such as shown in FIG. 11 having unthinned end portions 16 and 17 at the sides of the channel box, and also a channel box body 15 as shown in FIG. 12, in which two etching steps are carried out, a first to form thinned regions 19a in each side of the channel box and a second to form two grooves 18 leaving yet smaller wall thickness within each of the thinned regions 19a. FIG. 13 shows the resulting cross-section. These shapes are easily achieved by suitable masking for the chemical etching step or steps.

For shapes such as those of FIGS. 11 and 12, the embodiment of FIG. 6 provides the further advantage that the welding step is performed on material having a uniform thickness throughout its length, so that difficulties caused by variation in the thickness of the welded edges are avoided.

It is mentioned that the structures shown in FIGS. 11 and 12 are disclosed in copending U.S. patent application Ser. No. 840,939 filed 25 Feb. 1992, FIGS. 5 and 6 and European patent application no. 92102529.2 (corresponding to Japanese applications 3-29789 and 3-143409).

Figure 4:
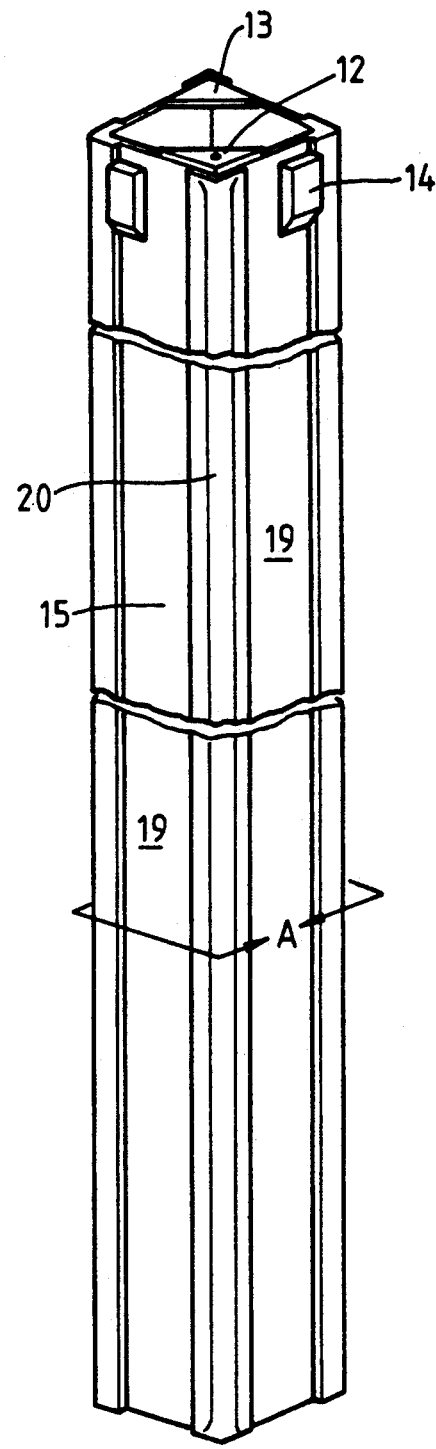
FIG. 4 is a perspective view of a further known channel box.

Referring now to FIG. 8, there is here shown an alternative method embodying the invention for fabrication of the channel box shown in FIGS. 4 and 5, in which the solution heat treatment and the etching are both performed on a flat zirconium alloy plate 1. The first step in the process of FIG. 8 is to subject the flat plate 1 to a solution heat treatment with quenching, as described above, to produce the heat treated flat plate 1a of uniform thickness. The heat treated plate 1a is then masked, as also described above and then subjected to the etching step described above to produce a U-section profile plate 1b having three thinned portions.

The U-section profile plate 1b is then bent, at its thicker portions which will be the corners of the channel box. Two such U-section pieces 11b are then butt welded to produce a tube 15 having thinned side portions. Thereafter sizing is carried out, as described above, and the finishing steps are performed.

An advantage of this process is such that it is particularly easy to check the dimensions of the profiled plate 1b, to ensure it is within the appropriate tolerances. In this method also it is easy to use the oxide as the masking material. On the other hand, although good corrosion resistance is given to the zirconium alloy by the solution heat treatment, there may be some loss of corrosion resistance at the welded zones, because of the effect of the welding process.

FIG. 9 shows yet another method of carrying out the invention, in which both the solution heat treatment and the thinning steps are carried out on U-shaped pieces 11a of uniform sheet thickness. A flat zirconium alloy plate 1 is first bent into the shape of the U-section piece 11a, which is then subjected to solution heat treatment as described above, followed by an etching process as described above to thin the appropriate side parts to provide the piece 11b. Two such pieces 11b are joined by butt welding to give the tube 15. The tube 15 is subjected to sizing and other finishing steps, to form the channel box of FIGS. 4 and 5. This method also allows accurate measurement of the thickness of the thinned parts after the etching process, but has the disadvantage that the U-section pieces are less easily handled in the solution heat treatment process.

Figure 10:
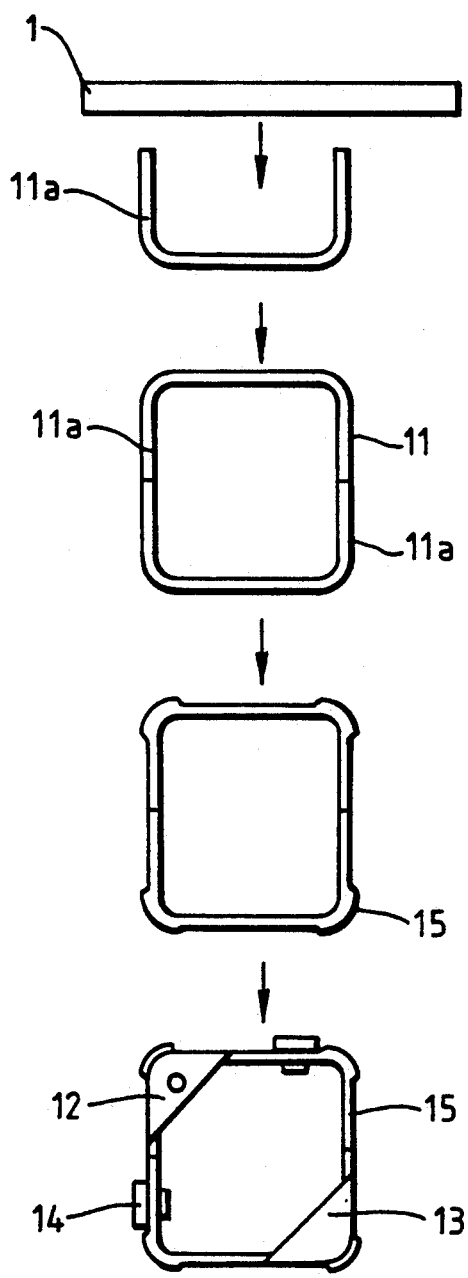
FIG. 10 is a flow diagram illustrating a fourth fabrication method for a channel box, embodying the invention.

FIG. 10 shows yet a further method according to the invention, in which the solution heat treatment described above is carried out on two U-section pieces 11a, formed by bending flat zirconium alloy plates 1. Two such U-section pieces 11a, after this heat treatment, are welded together to form a tube 11, which is then subjected to chemical etching, in the same way as described above for FIG. 6.

FIG. 10 also illustrates another method according to the invention, in which the solution heat treatment described above is carried out on the flat zirconium alloy plate 1. Two such plates 1, after this heat treatment, are bent to form U-section pieces 11a and thereafter are welded together to form a tube 11, which is then subjected to chemical etching, in the same way as described above for FIG. 6.

As alternatives to chemical etching, there have been mentioned electro-discharge grinding, electro-discharge machining and electro-etching. In electro-discharge grinding, a rotating electrode is moved close to the surface to be removed, whereas in electro-discharge machining the electrode does not move transversely relative to the surface. These techniques do not exert any stress on the metal being thinned, and have the advantage compared with chemical etching that a masking step is unnecessary. This is advantageous particularly if masking has been made on the inside of a tubular structure.

What is claimed is:

1. A method of fabricating a part for use in a nuclear reactor which part is exposed to neutron flux in use, from sheet material selected from metals and alloys having a high temperature phase which is different from a second phase which forms when said material is quenched from a high temperature to room temperature, said method including the steps of
   (a) solution heat treatment of said sheet material including quenching from a temperature at which said high temperature phase is present to a temperature at which said second phase forms, and
   (b) thinning at least one portion of said sheet material relative to other portions by a non-stressing thinning process, wherein step (a) is performed before step (b).

2. A method according to claim 1, including a step of bending said sheet material.

3. A method according to claim 2, further comprising a step (c) of welding two portions of said sheet material to join them, wherein said step of bending is performed between step (a) and step (b), and wherein step (c) is performed after step (b).

4. A method according to claim 1, including a step (c) of welding two portions of said sheet material to join them, wherein step (a) is performed after step (c).

5. A method according to claim 4 wherein said non-stressing thinning process is chemical etching in which an oxide film formed by oxidation of said sheet material is employed as a mask.

6. A method according to claim 1, wherein said sheet material is an alloy whose main component is selected from a group consisting of Zr, Hf and Ti.

7. A method according to claim 6 wherein said non-stressing thinning process is chemical etching in which an oxide film formed by oxidation of said sheet material is employed as a mask.

8. A method according to claim 1 wherein said non-stressing thinning process is chemical etching in which an oxide film formed by oxidation of said sheet material is employed as a mask.

9. A method according to claim 1, wherein said non-stressing thinning process is chemical etching, with portions of the sheet material not to be thinned being covered with a mask.

10. A method according to claim 9, wherein said mask is made of polytetrafluoroethylene fabric.

11. A method according to claim 9, wherein the chemical etching is performed with a solution of HF and $HNO_3$ as an etching liquid.

12. A method according to claim 1, wherein said sheet material is made of a zirconium alloy.

13. A method of fabricating a channel box for use in a nuclear reactor, in which Zr-alloy sheet material is formed into a tubular channel box, said method including the steps of
   (a) solution heat treatment of the Zr-alloy sheet material including quenching from a temperature at which $\beta$-phase is present and
   (b) thinning at least one portion of said Zr-alloy sheet material relative to other portions by a non-stressing thinning process,
   wherein step (a) is performed before step (b).

14. A method according to claim 13, including a step (c) of welding two portions of said sheet material to join them, wherein step (a) is performed after step (c).

15. A method according to claim 14, wherein said two portions are on two pieces of said sheet material.

16. A method according to claim 13, wherein said sheet material is formed into a tube, before said step (b).

17. A method according to claim 13, wherein said sheet material is formed into a tube, before said steps (a) and (b).

18. A method according to claim 13, wherein said steps (a) and (b) are performed on said sheet material when in flat plate form.

19. A method according to claim 13, wherein said step (b) is performed on sheets of said sheet material having a U-section shape, and said sheets are subsequently joined to form the channel box.

20. A method according to claim 13, wherein said channel box is assembled from two U-section sheets of said material, by welding along weld lines which are located at central portions of opposite sides of said box.

21. A method according to claim 13, wherein said quenching is from a temperature at which both α- and β-phases of said Zr-alloy are present.

22. A method according to claim 13 wherein said channel box has sides and corners and by said step (b) at least two said portions, which are located within said sides of said channel box, are thinned, said corners of said channel box remaining unthinned.

23. A method according to claim 13, wherein said non-stressing thinning process is chemical etching, with portions of the sheet material not to be thinned being covered with a mask.

24. A method according to claim 23, wherein said mask is made of polytetrafluoroethylene fabric.

25. A method according to claim 23, wherein the chemical etching is performed with a solution of HF and $HNO_3$ as an etching liquid.

26. A method of fabricating a channel box for use in a nuclear reactor, comprising the steps of:
   (i) bending two flat plates of Zr-alloy sheet material into U-section shaped pieces,
   (ii) welding said U-section shaped pieces together at edges thereof to form a hollow tubular body having sides and corners,
   (iii) performing a solution heat treatment of said hollow tubular body including quenching it from a temperature at which β-phase is present
   (iv) thinning selected portions of said sides of said hollow tubular body after step (ii) by chemical etching.

27. A method of fabricating a channel box for use in a nuclear reactor, comprising the steps of
   (i) performing a solution heat treatment of two flat plates of Zr-alloy sheet material including quenching them from a temperature at which β-phase is present,
   (ii) thinning selected portions of said plates, after step (i), by chemical etching and
   (iii) bending said plates, after step (ii), into U-section shaped pieces having corners and sides, with said thinned portions thereof located in said sides
   (iv) welding said U-section shaped pieces together at edges thereof to form a hollow tubular body.

28. A method of fabricating a channel box for use in a nuclear reactor, comprising the steps of
   (i) bending two flat plates of Zr-alloy sheet material into U-section shaped pieces having sides and corners,
   (ii) performing a solution heat treatment of said U-section shaped pieces including quenching them from a temperature at which β-phase is present,
   (iii) after step (ii), thinning selected portions, located in said sides of said U-section shaped pieces, by chemical etching, and
   (iv) after step (iii) welding said U-section shaped pieces together at edges thereof to form a hollow tubular body.

29. A method of fabricating a channel box for use in a nuclear reactor, comprising the steps of
   (i) performing solution heat treatment of two flat plates of Zr-alloy sheet material including quenching them from a temperature at which β-phase is present,
   (ii) bending said two plates, after step (i), into U-section shaped pieces,
   (iii) after step (ii), welding said U-section shaped pieces together at edges thereof, to form a hollow tubular body having sides and corners, and
   (iv) thinning selected portions of said sides of said hollow tubular body by chemical etching.

30. A method of fabricating a channel box for use in a nuclear reactor, comprising the steps of
   (i) bending two flat plates of Zr-alloy sheet-material into U-section shaped pieces,
   (ii) performing solution heat treatment of said U-section shaped pieces including quenching them from a temperature at which β-phase is present,
   (iii) after step (ii), welding said U-section shaped pieces together at edges thereof to form a hollow tubular body having sides and corners, and
   (iv) thinning selected portions, located in said sides of said hollow tubular body, by chemical etching.

31. A method of fabricating a channel box for use in a nuclear reactor, in which Zr-alloy sheet material is formed into a tubular channel box, said method including the steps of:
   (a) a solution heat treatment of the Zr-alloy sheet material including quenching from a temperature at which β-phase is present, and
   (b) thinning at least one portion of said Zr-alloy sheet material relative to other portions by a non-stressing thinning process, wherein step (a) is performed before step (b), and wherein said non-stress thinning process is selected from a group consisting of chemical etching, electro-discharge grinding, electro-discharge machining and electro-etching.

32. A method of fabricating a channel box for use in a nuclear reactor, in which Zr-alloy sheet material is formed into a tubular channel box, said method including the steps of:
   (a) solution heat treatment of the Zr-alloy sheet material including quenching from a temperature at which β-phase is present, and
   (b) thinning at least one portion of said Zr-alloy sheet material relative to other portions by a non-stressing thinning process, wherein step (a) is performed before step (b), and wherein said non-stressing thinning process is chemical etching in which an oxide film formed by oxidation of said Zr-alloy is employed as a mask.

33. A method of fabricating a channel box for use in a nuclear reactor, in which Zr-alloy sheet material is formed into a tubular channel box, said method including the steps of:
   (a) solution heat treatment of the Zr-alloy sheet material including quenching from a temperature at which β-phase is present,
   (b) thinning at least one portion of said Zr-alloy sheet material relative to other portions by a non-stressing thinning process, and
   (c) welding two portions of said sheet material to join them, wherein step (a) is performed before step (b), wherein step (a) is performed after step (c), and wherein said non-stressing thinning process is chemical etching in which an oxide film formed by oxidation of Zr-alloy is employed as a mask.

34. A method of fabricating a channel box for use in a nuclear reactor, in which Zr-alloy sheet material is formed into a tubular channel box, said method including the steps of:
   (a) solution heat treatment of the Zr-alloy sheet material including quenching from a temperature at which β-phase is present, and
   (b) thinning at least one portion of said Zr-alloy sheet material relative to other portions by a non-stressing thinning process, wherein step (a) is performed before step (b), wherein said sheet material is formed into a tube before step (b), and wherein said non-stressing thinning process is chemical etching in which an oxide film formed by oxidation of Zr-alloy is employed as a mask.

35. A method of fabricating a channel box for use in a nuclear reactor, in which Zr-alloy sheet material is formed into a tubular channel box, said method including the steps of:
   (a) solution heat treatment of the Zr-alloy sheet material including quenching from a temperature at which $\beta$-phase is present, and
   (b) thinning at least one portion of said Zr-alloy sheet material relative to other portions by a non-stressing thinning process, wherein said sheet material is formed into a tube before steps (a) and (b), and wherein said non-stressing thinning process is chemical etching in which an oxide film formed by oxidation of said Zr-alloy is employed as a mask.

36. A method of fabricating a channel box for use in a nuclear reactor, in which Zr-alloy sheet material is formed into a tubular channel box, said method including the steps of:
   (a) solution heat treatment of the Zr-alloy sheet material including quenching from a temperature at which $\beta$-phase is present, and
   (b) thinning at least one portion of said Zr-alloy sheet material relative to other portions by a non-stressing thinning process, wherein steps (a) and (b) are performed on said sheet material when in flat plate form, and wherein said non-stressing thinning process is chemical etching in which an oxide film formed by oxidation of said Zr-alloy is employed as a mask.

* * * * *